US010617054B2

(12) United States Patent
Gresch et al.

(10) Patent No.: US 10,617,054 B2
(45) Date of Patent: Apr. 14, 2020

(54) METHOD AND AGRICULTURAL UTILITY MACHINE FOR SPREADING CROP

(71) Applicant: DEERE & COMPANY, Moline, IL (US)

(72) Inventors: Valentin Gresch, Pfäffikon SZ (CH);
Florian Reinmuth, Sinsheim (DE);
Norbert Fritz, Ilvesheim (DE);
Christian Waibel, Mannheim (DE);
Martin Kremmer, Mannheim (DE);
Florian Schott, Bensheim (DE)

(73) Assignee: DEERE & COMPANY, Moline, IL (US)

(*) Notice: Subject to any disclaimer, the term of this patent is extended or adjusted under 35 U.S.C. 154(b) by 16 days.

(21) Appl. No.: 15/979,549

(22) Filed: May 15, 2018

(65) Prior Publication Data

US 2018/0332760 A1  Nov. 22, 2018

(30) Foreign Application Priority Data

May 19, 2017  (DE) .......................... 10 2017 208 558

(51) Int. Cl.
| | | |
|---|---|---|
| *A01B 63/111* | (2006.01) | |
| *A01B 59/06* | (2006.01) | |
| *A01F 25/18* | (2006.01) | |
| *A01B 69/00* | (2006.01) | |

(52) U.S. Cl.
CPC .......... *A01B 63/111* (2013.01); *A01B 59/066* (2013.01); *A01B 69/004* (2013.01); *A01F 25/186* (2013.01)

(58) Field of Classification Search
None
See application file for complete search history.

(56) References Cited

U.S. PATENT DOCUMENTS

| | | | | |
|---|---|---|---|---|
| 10,306,821 B2* | 6/2019 | Michalke | .............. | A01B 63/111 |
| 2014/0145837 A1* | 5/2014 | Douglas | .............. | B60Q 1/0017 |
| | | | | 340/431 |

FOREIGN PATENT DOCUMENTS

| | | |
|---|---|---|
| DE | 2615525 A1 | 10/1977 |
| DE | 8700031 U1 | 5/1987 |
| DE | 60130611 T2 | 7/2008 |
| DE | 102008063852 A1 | 7/2010 |
| DE | 102015004325 B3 | 5/2016 |
| EP | 1508264 A2 | 2/2005 |
| EP | 1825740 A1 | 8/2007 |
| EP | 3138733 A1 | 3/2017 |
| EP | 3338532 A1 | 6/2018 |
| FR | 2453598 A1 | 11/1980 |

OTHER PUBLICATIONS

European Search Report issued in counterpart application No. 18170904.9 dated Sep. 6, 2018. (8 pages).
German Search Report issued in counterpart application No. 102017208558.4 dated Jan. 22, 2018. (10 pages).

* cited by examiner

*Primary Examiner* — Tamara L Weber

(57) ABSTRACT

A method for distributing delivered crop during a spreading operation includes providing an agricultural utility machine and a spreading tool movably mounted thereto, automatically controlling a motion of the spreading tool, and spreading crop by the spreading tool.

20 Claims, 3 Drawing Sheets

METHOD AND AGRICULTURAL UTILITY MACHINE FOR SPREADING CROP

RELATED APPLICATIONS

This application claims priority to German Patent Application Ser. No. 10 2017 208 558.4, filed May 19, 2017, the disclosure of which is hereby incorporated by reference in its entirety.

FIELD OF THE DISCLOSURE

The present disclosure relates to a method and an agricultural utility machine for spreading crop.

BACKGROUND

Agricultural utility machines are used, among other things, for processing crop. EP 1 825 740 A1 discloses that the compaction properties of crop are of great importance for optimizing crop packing operations in the storage of crop in silos.

There are issues in conventional agricultural utility vehicles with spreading, or packing, crop uniformly in an efficient way. In the present disclosures, embodiments are described for overcoming the issues in the art.

SUMMARY

In a first embodiment of the present disclosure, delivered crop is spread during a spreading operation by a spreading tool, which is movably mounted on an agricultural utility machine. Here the spreading tool is situated, for example, in a front region of a forward moving agricultural utility machine. The spreading tool is made as a pusher blade, which pushes the crop forward and spreads it. Alternatively, the spreading tool can be designed as a silo spreader or the like. During the spreading or a packing operation, the spreading tool is at least partially, completely, automatically motion controlled. In this case the agricultural utility machine has an appropriate arrangement for motion control of the spreading tool. The arrangement can, for example, contain a hydraulic hitch for movable positioning of the spreading tool, a control device controlling the hydraulic lift, and a suitable sensor system.

The automatic motion control of the spreading tool enables automatic and accurate matching of it to physical and topographical boundary conditions during the spreading operation. The driver of the utility machine is unburdened during the spreading operation through this. Overall, a precise and time-wise efficient spreading of the crop is supported. A suitable sensor system for detection of the spreading tool or its environment, one or more control device(s) for processing the detected data, and, if necessary, additional components as parts of a system for motion control allow the automatic motion control of the spreading tool to be implemented in a technically simple way and at low cost. In particular, data from sensors, which are already present on the utility machine anyway to routinely carry out other purposes, are used here.

The spreading tool is completely, automatically motion controlled during the spreading operation, i.e., from the beginning to the end of the spreading operation. In particular, a user (for example, a driver of the agricultural utility machine) can replace the automatic motion control by a manual control of the spreading tool, if necessary.

The agricultural utility machine is generally a mobile utility machine for agricultural use, in particular, a tractor. Also, other utility machines, such as wheeled loaders or snowcats can optionally be used, provided they are adapted or modified for the spreading operation. The crop is usually delivered to the spreading site by a loading truck and spread there by means of the utility machine.

The spreading site can be variously designed. In an embodiment, the spreading site is designed as a silo, which in particular has a solid bottom and solid sidewalls. Fresh or wilted biomass (for example, green fodder) is put into the silo, spread, and packed there in layers.

In order to support accuracy during the automatic motion control of the spreading tool, a position or orientation of the spreading tool is determined in a defined coordinate system. For this, the surroundings of the spreading tool can be represented by a defined coordinate system. Orientation of the spreading tool means its tilt relative to a defined reference axis or reference plane (for example, earth vertical, earth horizontal, or the utility machine). The coordinate data of the spreading tool is indirectly determined in a global coordinate system by first determining position and orientation data of the utility machine via a satellite-supported position determining system (for example, GNSS receiver with integrated inertial measurement unit) and the position or orientation of the spreading tool are determined by processing the data. The position or orientation of the spreading tool are determined relative to the silo that is to be filled with crop. For this purpose, the silo and its lateral boundaries are stored in the defined coordinate system as coordinates. The known position or orientation of the spreading tool can then contribute to calculating a trajectory (in particular, a three-dimensional trajectory) for the spreading tool with high precision, so as to support efficient and uniform spreading of the crop in the silo.

Taking into account the coordinates, it is also possible to calculate a meaningful path for the utility machine and to display it to the driver via a visual indicator unit, display, or the like. If the utility machine follows the displayed path during a spreading operation, the calculated spreading tool trajectory can be used for the automatic motion control of the spreading tool. For example, the spreading tool is motion controlled so that its lower blade edge follows the intended spreading tool trajectory. In particular, the spreading tool trajectory becomes automatically, or dynamically, adjusted in dependence on current data during the spreading operation, so that uniform spreading of the crop, in particular a uniform filling of the silo, is supported.

At or after the end of the spreading operation, the spreading tool is automatically raised, in order to enable an expeditious and hindrance-free travel, in particular reverse travel, of the utility machine from the region of the spreading surface.

It is a benefit for an additional unburdening of the driver or operator of the utility machine during the desired uniform spreading of the crop if the spreading tool is motion controlled in dependence on a defined working height of the spreading tool. The working height can, for example, be defined as a distance between a lower edge of a pusher plate and the reference surface. The trajectory and consequently the automatic motion control of the spreading tool can then take place in dependence on the defined working height.

According to another design, it is advantageous for the automatic motion control of the spreading tool to take into account a reference surface, which is determined or detected as a surface contour along a spreader path for the spreading of the crop. The surface (for example, a bottom of a silo or an already spread or packed crop layer) is determined, for example, from previous passes over the already spread and packed crop. The data for this are obtained via suitable detection means and by taking into account the geometry of the utility machine. The detection means contain, for example, a GNSS receiver with integrated inertial measurement unit and, in addition, a sensor system (ultrasound or stereo camera).

In addition, for uniform spreading of the crop, it is beneficial if the working height can be changed during the spreading operation. In particular, the working height is varied in dependence on the crop that is to be spread. In this way the automatic motion control can be individually matched to the remaining crop that is still be spread during the spreading operation, so as to achieve spreading that is as uniform as possible.

The working height is defined and optionally changed during the spreading operation so that the delivered crop that is to be spread is completely spread by the spreading tool during a single pass through a spreading path. Through this, cost-increasing added passes of the utility machine are reliably avoided.

In particular, the variably definable and optionally variable working height makes it possible for it to be matched to a desired uniform layer thickness of the crop that is to be spread during a spreading operation. The layer thickness can then, in particular at a thickness of 20 cm to 40 cm, be defined in dependence on the properties of the crop, a packing ability of the utility machine or another vehicle in reference to the spread crop layer, or a spreading path to be traversed by the spreading tool, in particular a length of the silo.

Advantageously, the working height is defined and optionally changed during the spreading operation in dependence on at least one of the following parameters:

remaining crop still to be spread during a spreading operation, and a path still remaining along a spreading path for the spreading of the crop.

The remaining crop can be estimated via appropriate detection means (for example, a sensor system, stereo camera) with respect to its volume or its mass.

In one embodiment, the ply or layer of spread crop is then packed. This means that after a spreading operation, which in particular can already be completed after a single traverse of a spreading path (for example, along the lengthwise extent of a silo) by means of the spreading tool, a packing operation then takes place. The packing operation contains a single packing pass or packing cycle (for example, a combined forward and backward pass of the utility machine used for packing) or a sequence of several packing cycles (for example, several combined forward and backward passes). Several packing cycles means in particular a plurality of successive packing activities or passes of a utility machine along the same spreading path before a subsequent spreading operation begins.

For packing, the same utility machine, for example, travels over the already spread crop. In this case, its tires can already cause packing to occur. The spreading tool can be exchanged for a packing tool in the form of a silo roller or the like, where to avoid a time-consuming tool exchange, the spreading tool can also be mounted on a front hydraulic hitch and the packing tool can be mounted on a rear hydraulic hitch of the utility machine. Alternatively, the packing can take place by means of another appropriate utility machine with a packing function (for example, by means of suitable tires) or a packing tool. In a spreading operation, the utility machine makes, for example, one forward pass along the length of a silo so as to spread the delivered crop along a spreading path. In a packing operation, the same or a different utility machine carries out a packing cycle or a plurality of packing cycles along the length of a silo.

In an alternative embodiment, the packing of a spread crop disclosed is carried out independent of the way or with which machine the crop was previously spread. To guarantee stable preservation of the crop, a high packing density is important. This is particularly true for fresh or wilted biomass or cut material that is put into a silo and is fed as silage. In order to determine a current packing density with sufficient accuracy, a stored or entered parameter or characteristic is used by a control device to calculate the packing density. At least one of the following parameters is taken into account:

at least one parameter of the utility machine used for packing, at least one parameter of the crop, and a number of packing cycles already conducted during the current packing operation.

Machine-specific properties are suitable as the specific parameter of the utility machine used for packing, for example, the tires of the utility machine, the tire contact surface, tire pressure, tire position, weight of the utility machine, axle load distribution, geometric data of the spreading tool such as width and height, and position of the mounting point of the spreading tool on the utility machine. For example, individual parameters like tires and tire position (or the corresponding parameters of a packing tool such as a silo roller) are selected from a memory unit or an available databank. By taking into account the tire pressure, which can be manually entered in the operator interface or measured by a tire pressure control system, the corresponding tire contact surfaces can be determined by means of the memory unit or databank. For the determination of the packing density, a packing pressure in particular is calculated, which is dependent on the relevant axle load, the orientation (tilt and roll angle) of the utility machine used for packing and the tire contact surface. The weight of the utility machine (optionally with added weights or the spreading tool) and an axle load distribution can be manually entered by the operator via the operator interface. Alternatively, the weight of the utility machine and its axle loads can be automatically determined by processing various parameters on the utility machine and then made available as data in the memory unit. Geometric data for the spreading tool or the packing tool are likewise entered via the operator interface and then stored in the memory unit. Alternatively, individual items of the data can be sent to an electronic interface of the utility machine via an external electronic connection (for example, a mobile radio), instead of via the operator interface, and then sent further to the memory unit, for example, via a control device.

Specific parameters of the crop are selected via an operator interface on the utility machine. Alternatively, relevant parameters of the crop can be detected directly from the previously active harvesting machine, for example, via a crop moisture and nutrients sensor or via the setting of a chop length in the case of field choppers. The data can then be transmitted from the harvesting machine electronically (for example, by mobile radio) to the utility machine used for packing. In particular, the type of crop (for example, corn silage, grass silage), the moisture of the crop (for example, wet, medium wet, dry), and the chop length of the crop are in particular taken into account as parameters. Wet crop can be packed more easily and therefore needs fewer packing cycles or lower packing pressure for a sufficient packing density. In the same way, the chop length is relevant, since shorter chopped pieces can be better packed.

A decision can be made whether an additional number of packing cycles is necessary within the current packing operation as a function of the current packing density. The additional number can be a single packing cycle or a sequence of several packing cycles. For an efficient packing operation, it is beneficial to transmit the determined number of additional packing cycles to an operator of the utility machine via a visual indicator unit (display) of an operator interface.

In particular, the decision whether an additional number of packing cycles is necessary within the packing operation is made dependent on a comparison between the measured current packing density and a preset value of a minimum packing density. The value of the minimum packing density is dependent, in particular, on properties or parameters of the crop. The values of minimum packing densities can be obtained from empirical experiments and stored in a memory unit. With regard to the comparison of a current packing density with the preset minimum packing density, a current reference surface or surface contour in the area of the spreading and packing activities can be divided into surface segments. The passes of the associated tires (for example, tractor tires) of the utility machine or individual roller segments in the case of a silo roller mounted thereon are summed up for each individual surface segment, taking into account the packing pressure and the speed of travel. If a value of the minimum packing density, which is dependent on properties of the crop, has been reached, the affected surface segment is characterized as sufficiently packed.

Then a next driving path is specified to a driver (or an automatic steering system) of the packing utility machine or a signal is sent that a new spreading operation can be carried out. If a plurality of utility machines is being used in the area of the spreading and packing activities (for example, in a silo), the machines can communicate by means of an electronic interface (for example, mobile radio) and exchange data regarding achieved packing densities, etc., for individual surface segments and with reference to planned or established packing and spreading operations.

In one embodiment, the spreading tool can be movably mounted directly on a chassis or support structure of the utility machine. In this case the position of the spreading tool can be set, for example, via two lateral lift cylinders. A change of its orientation or tilt relative to the utility machine in this case is frequently not possible. In order to enable a change of the orientation relative to the utility machine in a technically simple way, the spreading tool is movably mounted via a hydraulic hitch (in particular, a front hydraulic hitch) on the utility machine, i.e., directly on the chassis or support structure of the utility machine. The hydraulic hitch is made as a three-point hitch with an upper lift arm or as a four-point hitch with two upper lift arms. The spreading tool is mounted in an articulated way to the hydraulic hitch. The hydraulic hitch can be controlled via a suitable arrangement (for example, sensor system, control device). Correspondingly, the spreading tool is at least partially, in particular completely, automatically motion controllable.

In another embodiment, the utility machine carrying the spreading tool is, especially for night operation, outfitted with an arrangement of lights which can be individually activated and deactivated or switched on and off. In particular, the arrangement of lights is made as an arrangement of light-emitting diodes (LEDs) on the utility machine. The individually controllable lights allow them to be controlled independent of the current operating area of the utility machine. The control takes place in dependence on at least one of the following features:

a tilt of the spreading tool, in particular, relative to the utility machine, and a forward or reverse travel of the utility machine.

In this way the arrangement of lights can react, for example, to changes of position or orientation of the spreading tool. Lights with a light cone aimed at the current position of the spreading tool can be activated, while other lights not focused on the current position of the spreading tool can be or can remain deactivated. Consequently, the current operating area in front of or behind the utility machine can be optimally lighted without blinding any operator or driver of other machines (for example, drivers of a loader wagon that is delivering new crop). Individual lights can be aimed in the driving direction both forward or backward, so that the lights can also be controlled independently from a forward or reverse travel.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
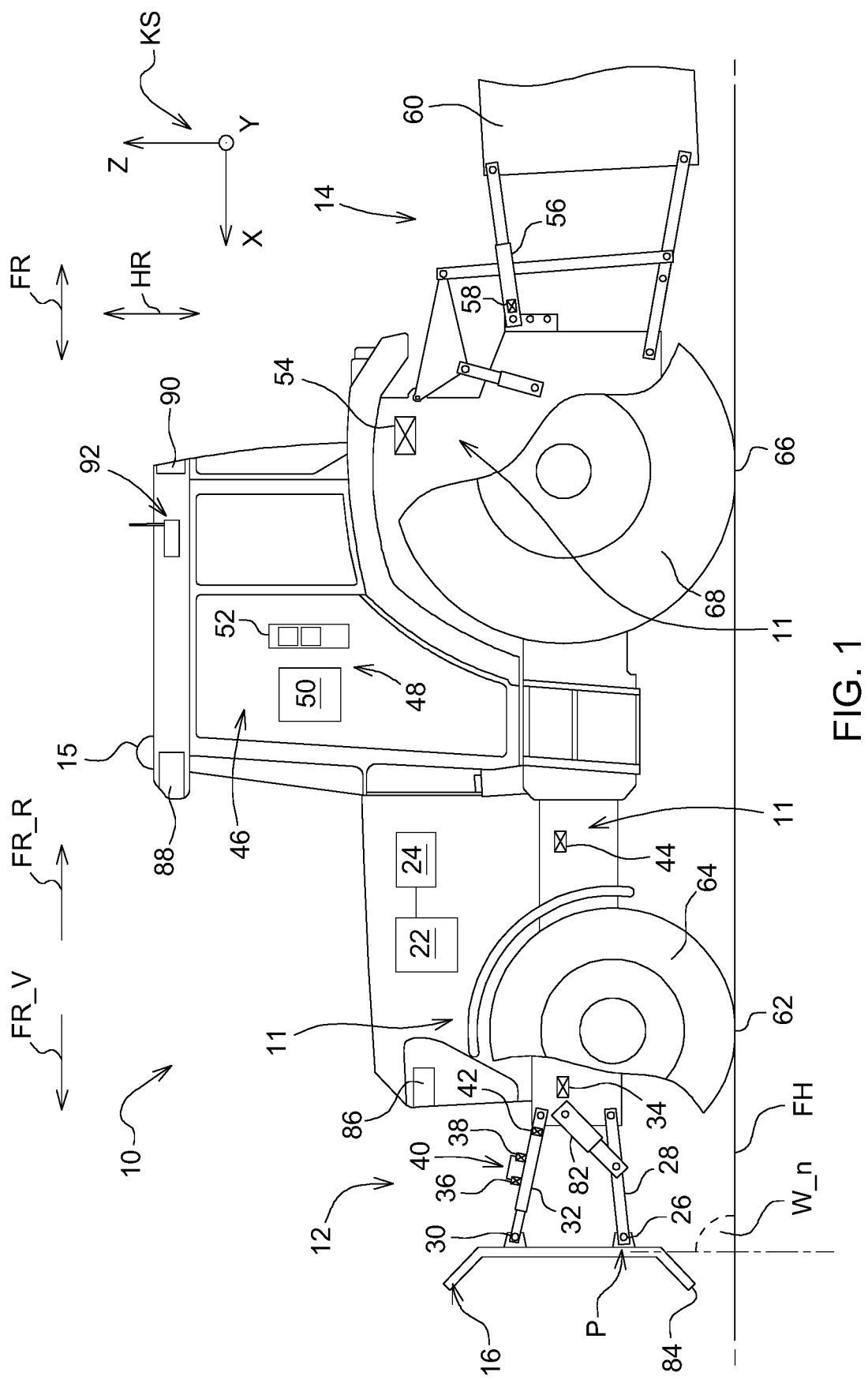
FIG. 1 is a side view of an agricultural utility machine with a spreading tool.

FIG. 1 shows a mobile and agricultural utility machine 10 made as a tractor, or a vehicle with a chassis or support structure 11, on which a front hydraulic hitch 12 and a rear hydraulic hitch 14 are mounted. A spreading tool 16 in the form of a pusher blade is movably mounted on the front hydraulic hitch 12. The spreading tool 16 serves to spread and level crop 18, for example, corn or grass silage. In other embodiments the blade can be replaced by a different spreading tool 16 (for example, a silo spreader). For packing of the spread crop 20, the spreading tool 16 on the front hydraulic hitch 12 can be replaced by a packing tool (for example, silo roller), which is not shown here.

The spreading tool 16 is automatically motion controlled via the front hydraulic hitch 12. For this purpose, the front hydraulic hitch 12 is controlled by an arrangement which has a control device 22 and a connected memory unit 24. The spreading tool 16 is hinged to two lower arms 28, which are aligned across the plane of the page via two lower hitch points 26. The spreading tool 16 is hinged to an upper link arm 32 via an upper hitch point 30.

A position P (for example, in the region of lower hitch points 26, which are still to be described) and an orientation (for example, a tilt angle W_n of a plane of the spreading tool 16 relative to a driving horizon FH or driving direction FR or relative to another reference parameter such as a vertical direction HR of the utility machine 10) of the spreading tool 16 are established for a specific setting of the front hydraulic hitch 12 by a calibration operation. For this, geometric data of the spreading tool 16 are also stored in the memory unit 24. Based on the calibration, changes of position and orientation of the spreading tool 16 can be automatically achieved by the control device 22 by appropriately controlling the front hydraulic hitch 12 as soon as a change of position or orientation is determined to be necessary.

Figure 2:
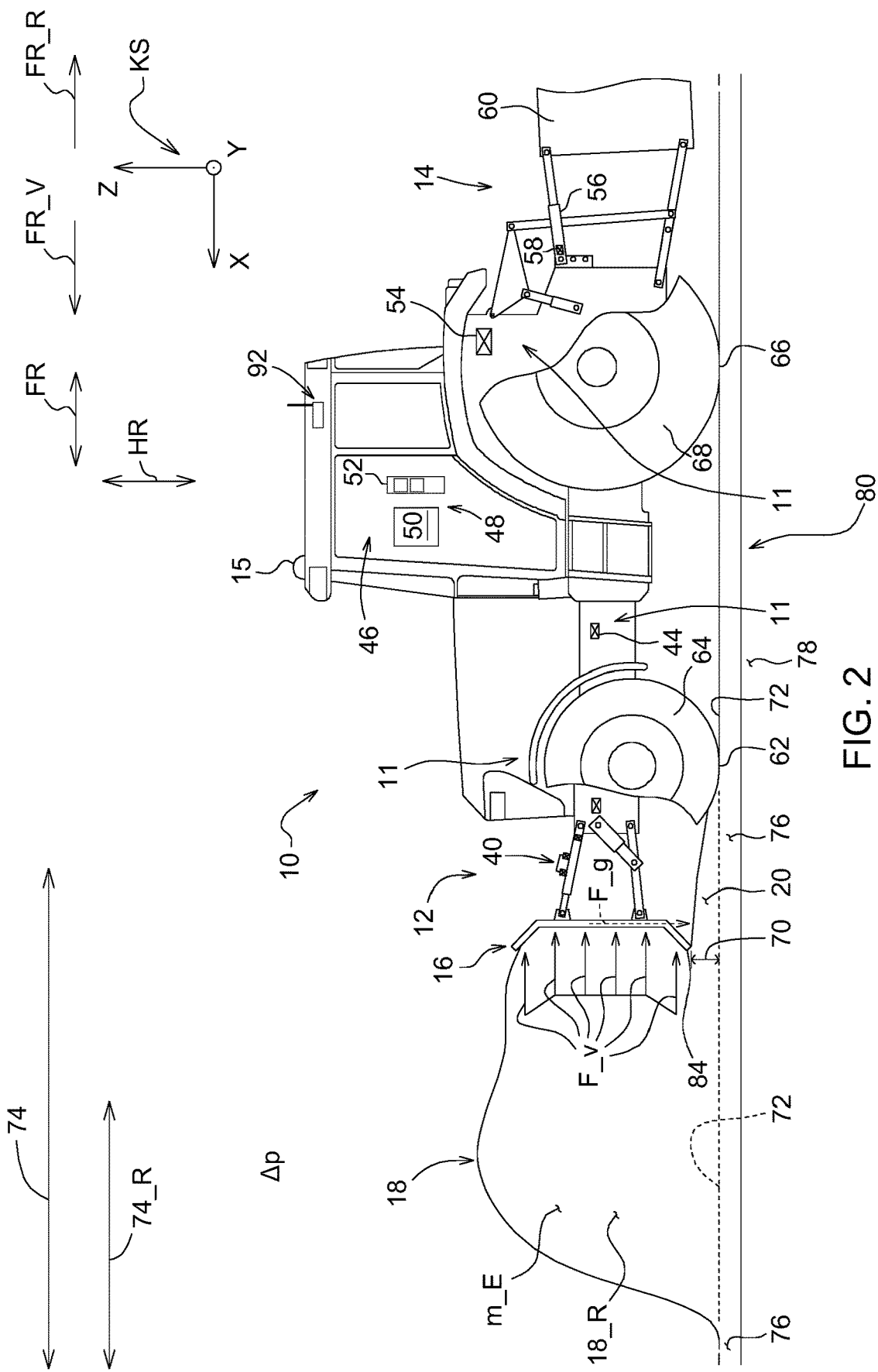
FIG. 2 shows the utility machine of FIG. 1 during a spreading operation.

To determine the position P and the orientation of the spreading tool 16 in a defined (for example, global) coordinate system, a position and orientation of the utility machine 10 are first determined via a receiver unit 15 (for example, GNSS) with an integrated inertial measurement unit. By processing the data and taking into account the setting of the front hydraulic hitch 12, the position P and the orientation of the spreading tool 16 can then be determined. In the coordinate system, the coordinates of a silo, in particular a bunker silo, with its lateral boundaries, can also be taken into account. This enables a determination of the position P and orientation of the spreading tool 16 relative to the silo. A defined coordinate system KS is indicated in FIGS. 1 and 2 by an x axis that runs parallel to the direction of travel FR of the utility machine 10, a z axis that runs parallel to the vertical direction HR of the utility machine 10, and a y axis that runs perpendicular to the x axis and the z axis.

A change of the position P of the spreading tool 16 takes place, for example, via a determination and adjustment of a lift height of the front hydraulic hitch 12, in particular by determining the position of the lower hitch points 26. For this, a position sensor 34 determines the position of the lower link arm 28 and, consequently, if the lower link arm geometry is known, the relevant position of the lower hitch points 26 is known indirectly as well.

The upper link arm 32 is equipped with a measurement system 40 for determining the force acting along the upper link arm 32 in the longitudinal direction, where the evaluation of the force will be explained below by means of FIG. 2. The force can be determined by means of the measurement system 40. In the embodiment example the measurement system 40 contains a check valve block with two pressure sensors 36, 38, which measure a hydraulic pressure on the rod and piston side of a hydraulic cylinder on the hydraulic top link arm 32. Via this pressure measurement and taking into account the geometry of the hydraulic cylinder, the force on the hydraulic upper link arm 32 can be determined. Alternatively, the measurement system 40 can, in the case of a mechanical upper link arm 32, be replaced, for example, by a force measurement bolt, which is positioned on the upper hitch point 30 or on the opposite hitch point between the upper link arm 32 and the support structure 11, so as to determine the force on the upper link arm 32.

A change of the orientation of the spreading tool 16 takes place, for example, via a determination and adjustment of an angular position of the upper link arm 32 relative to the utility machine 10. For this, the upper link arm 32 is equipped with a measurement system 42 for determining the orientation, i.e., an angular position, of the upper link arm 32 relative to the utility machine 10. In one embodiment, the measurement system 42 is designed as an inertial measurement unit integrated into a universal joint between the upper link arm and the support structure 11. The inertial measurement unit measures accelerations and rates of rotation in all three spatial directions. The utility machine 10 likewise has an inertial measurement unit 44. This can also be used to monitor the orientation and dynamics of the utility machine 10. The angular position of the upper link arm 32 relative to the utility machine 10 can be determined by comparing the sensor data of the two inertial measurement units 42, 44. Alternatively, the angular position can be determined by a length measurement system integrated into the upper link arm 32 and via data about the geometry of the front hydraulic hitch 12.

As already mentioned, the control device 22 serves in particular to process data from the described sensor system and to control the hydraulic hitches 12, 14. The memory unit 24 has a stored data bank for storing data about the spreading or packing of the crop 18. For example, this is machine-specific data (for example, the tires of the utility machine, tire pressure, tire contact surface, tire position, weight of utility machine, axle load distribution, geometry of spreading tool, position of hitch points 26, 30 of the spreading tool 16). In a cab 46 of the utility machine 10 is an operator interface 48 with a visual indicator unit 50 (for example, a display) and an input unit 52. The operator interface 48 serves to input calibration and process parameters for visual representation of the spreading or packing operations and for assisted navigation of the utility machine.

A sensor system is, or measurement systems are, likewise disposed on the rear hydraulic hitch 14 for determining, among other things, the hydraulic hitch position (by means of a measurement system 54), an angular position of an upper link arm 56 (by means of a measurement system 58), and a force on the upper link arm 56. An accessory 60 in the form of an added weight is mounted on the rear hydraulic hitch 14. It serves to increase the total weight of the utility machine 10 so as to increase the wheel loads and thus the effective pressure on the tire contact surfaces 62 of the front tires 64 and the tire contact surfaces 66 of the rear tires 68 of the utility machine 10 for packing the crop 18. In principle, the position or lift height and the orientation of the added weight 60 are also changed by means of a suitable control and setting of the rear hydraulic hitch 14, i.e., analogous to the spreading tool 16, in dependence on a position and orientation of the utility machine 10. The changes are controlled by the control device 22 so as to optimize the wheel loads.

To unburden an operator of the utility machine 10, the position P or the orientation of the spreading tool 16 is automatically set and optionally automatically adjusted. In the automatic motion control of the spreading tool 16, a differentiation is made between a spreading operation and a packing operation with one or more packing cycles.

FIG. 2 shows that in a spreading operation, the spreading tool 16 is motion controlled so that a defined working height 70 of the spreading tool 16 is set relative to a reference surface 72. The reference surface 72 is detected as a surface contour of the already spread and packed crop 76 from previous passes of the utility machine 10 along a spreading path 74. The already spread and packed crop 76 lies on a bottom 78 of a bunker silo 80. The working height is set in particular so that, depending on the properties of the crop 18 and the packing ability of the utility machine 10 (or another utility machine), the new layer of spread crop 20 has a thickness of about 20 cm to 40 cm. For this, the control device 22 controls the front hydraulic hitch 12, in particular its lift cylinder 82, so that the spreading tool 16 or its lower edge 84 is guided at the defined working height 70. As desired, it can also be specified via the operator interface 48 that the orientation of the spreading tool 16 is readjusted during the pass along the spreading path 74. If this function is activated, the angular position of the upper link arm 32 is determined by the measurement system 42, and the orientation of the spreading tool 16 is indirectly determined by taking into account the relevant position of the lower hitch points 26 derived by means of the position sensor 34. By controlling the upper link arm 32, the orientation of the spreading tool 16 can be readjusted so that the spreading tool is always disposed perpendicular to the bottom 78 or to a reference surface 72 or to another reference plane, regardless of a tilt angle of the utility machine 10. An orientation that deviates from the vertical position of the spreading tool 16 as in FIGS. 1 and 2 can also be set via the operator interface 48 and the control device 22.

A spreading operation is already complete when the spreading tool 16, or the utility machine 10, has traversed the spreading path 74 in the forward direction FR_V a single time. At the end of a spreading operation, thus after complete spreading of the crop 18, the spreading tool 16 is automatically lifted relative to the spread crop 20. A reverse travel of the utility machine 10 in the reverse direction FR_R can then easily take place without any hindrances. During a subsequent packing operation, the spreading tool 16 also remains in the lifted position. Alternatively, the spreading tool 16 can be exchanged for a packing tool, where to avoid a time-consuming tool exchange, however, the spreading tool 16 is mounted on the front hydraulic hitch 12 and the packing tool on the rear hydraulic hitch 14 of the utility machine 10.

The thickness of the layer of the newly spread crop, within a region of permissible layer thicknesses (for example, from 20 to 40 cm), is estimated so that the crop 18 lying in front of the spreading tool 16 becomes as much as possible uniformly spread along the entire spreading path 74 of the silo 80 (for example, the lengthwise extent of a silo). In particular, in the estimation, it is also taken into account that after traversing the spreading path 74, no more crop 18 should be present in front of the spreading tool 16. Correspondingly, the thickness is adjusted on the basis of the amount of crop (for example, volume, mass) that is actually being conducted in front of the spreading tool 16. For this, a mass m_E of the crop 18 is estimated via an evaluation of the force on the upper link arm 32 or a pressure difference Δp between the two pressure sensors 36, 38 in measurement system 40. Here, the pressure difference Δp is particularly dependent on a weight force F_g of the spreading tool 16 and on forces F_v, which are exerted on the spreading tool 16 during the operation of spreading crop 18. Based on an evaluation of the pressure difference Δp or the force on the upper link arm 32, one can determine what mass m_E of crop 18 and thus what remaining crop 18_R is still in front of the spreading tool 16. If an adjustment of the estimated layer thickness is necessary for complete distribution of the crop 18 or the remaining crop 18_R along the spreading path 74, the working height 70 can be appropriately adjusted or changed while taking into account a remaining path 74_R along the spreading path 74. It should be noted here that the spreading path 74 and remaining path 74_R represented in FIG. 2 are indicated only schematically by arrows and are not to scale.

The utility machine 10 is, in particular for night operation, equipped with a plurality of lighting units 86, 88, 90. The adaptive lighting system has a plurality of LEDs, which can be individually activated and deactivated or switched on and off. The individually controllable LEDs allow them to be controlled in dependence on the current operating area of the utility machine 10. In this way, the lighting units 86, 88, 90 can react, for example, to changes of position or orientation of the spreading tool 16. Consequently, the current operating area in front of or behind the utility machine 10 can be optimally lighted without any operator or driver of other machines (for example, driver of a loader wagon with new crop) becoming blinded. The lighting units 86, 88, 90 can also be differently controlled in dependence on forward or reverse travel.

Figure 3:
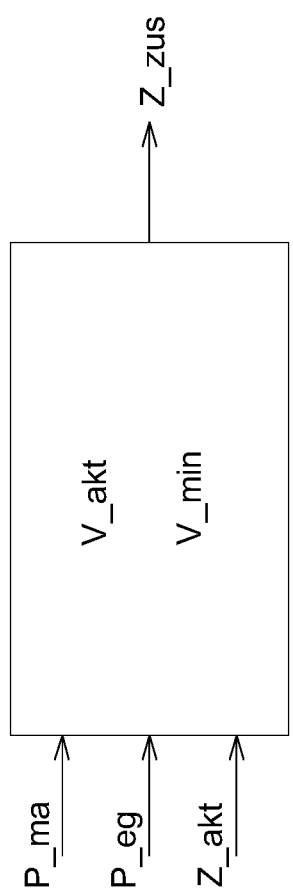
FIG. 3 is a block diagram of a data process during a packing operation.

During a packing operation, the number of packing cycles still to be carried out before a new spreading operation can be carried out can be shown to an operator or driver of the utility machine 10 on the display unit 50. For this, a packing that has already taken place during the current packing operation, i.e., a current packing density V_akt, is determined. Specific parameters P_ma of the utility machine 10 (or another utility machine used for the packing), specific parameters P_eg of the crop 18, and the number Z_akt of packing cycles already conducted during the current packing operation are taken into account for this determination according to FIG. 3. The value of the determined current packing density V_akt is compared with a preset value of a minimum packing density V_min. The value of the minimum packing density V_min is dependent on properties or parameters of the crop 18. The values of the minimum packing densities V_min are stored in the memory unit 24. Depending on the result of the comparison between the current packing density V_akt and the minimum packing density V_min, an additional number Z_zus of packing cycles that are still to be carried out during the current packing operation is determined and signalled to the display unit 50. If the determined current packing density V_akt reaches or exceeds the associated minimum packing density V_min, no additional packing cycles are carried out. During a packing operation, the determined number Z_zus of additional packing cycles can be updated.

The number Z_akt of packing cycles already carried out and the number Z_zus of additional packing cycles can also be referred to individual defined surface segments of the reference surface 72. A packing cycle consists of a forward pass in the forward direction of travel FR_V and a reverse pass in the reverse direction of travel FR_R. Alternatively, the packing cycle consists of only one forward or reverse pass. A packing cycle can be related to a pass along the entire packing path 74 or to a pass along a segment of the packing path 74 for a surface segment of the reference surface 72.

If a plurality of utility machines 10 is used to fill the silo 80, they can communicate by means of an electronic interface 92 (for example, a mobile radio network) and exchange data regarding the achieved packing density, etc., for individual surface segments of the reference surface 72 and with respect to planned or established packing and spreading operations.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for distributing delivered crop during a spreading operation, comprising:
providing an agricultural utility machine and a spreading tool movably mounted thereto;
automatically controlling a motion of the spreading tool;
spreading crop by the spreading tool;
providing a defined coordinate system;
determining a position or an orientation of the spreading tool in the defined coordinate system; and
determining the position or orientation of the spreading tool relative to a silo.

2. The method of claim 1, wherein the spreading step comprises spreading the crop in a silo.

3. The method of claim 1, further comprising controlling the motion of the spreading tool so that a defined working height of the spreading tool is set relative to a reference surface.

4. The method of claim 1, further comprising packing the spread crop during a packing operation.

5. A method for distributing delivered crop during a spreading operation, comprising:
providing an agricultural utility machine and a spreading tool movably mounted thereto;
automatically controlling a motion of the spreading tool;
spreading crop by the spreading tool;
controlling the motion of the spreading tool so that a defined working height of the spreading tool is set relative to a reference surface; and
defining the working height such that the crop is completely spread by the spreading tool during a single traverse of a spreading path.

6. The method of claim 5, further comprising:
providing a defined coordinate system; and
determining a position or an orientation of the spreading tool in the defined coordinate system.

7. The method of claim 6, further comprising determining the position or orientation of the spreading tool relative to a silo.

8. The method of claim 5, further comprising determining the reference surface as a surface contour along a spreading path for the spreading of the crop.

9. The method of claim 5, further comprising changing the working height during the spreading operation.

10. The method of claim 5, further comprising defining the working height during the spreading operation in dependence on at least one of a remaining crop still to be spread during a spreading operation and a remaining path along a spreading path for the spreading of the crop.

11. A method for distributing delivered crop during a spreading operation, comprising:
providing an agricultural utility machine and a spreading tool movably mounted thereto;
automatically controlling a motion of the spreading tool;
spreading crop by the spreading tool;
packing the spread crop during a packing operation; and
determining a packing density of the packed crop based on at least one of at least one parameter of a utility machine used for packing, at least one parameter of the crop, and a number of packing cycles already carried out during the packing operation.

12. The method of claim 11, further comprising executing at least one more packing cycle during the packing operation based on the determined packing density.

13. An agricultural utility machine, comprising:
a chassis of the machine;
a spreading tool movably mounted to the chassis for spreading crop during a spreading operation;
an arrangement including at least a control device, the control device configured to automatically control a movement of the spreading tool during the spreading operation; and
a defined coordinate system, wherein the control device is configured to determine a position or an orientation of the spreading tool in the defined coordinate system;
wherein the control device is configured to determine the position or orientation of the spreading tool relative to a silo.

14. The machine of claim 13, wherein the arrangement comprises a hydraulic hitch coupled to the chassis, the hitch being movably mounted to the spreading tool.

15. The machine of claim 14, wherein the hitch comprises a three point hitch.

16. The machine of claim 13, further comprising a plurality of lights individually controllable for activation and deactivation based on at least one of an orientation of the spreading tool and a forward or reverse travel of the utility machine.

17. The machine of claim 13, wherein the spreading tool comprises a working height, the control device controlling the movement of the spreading tool so that the working height of the spreading tool is set relative to a reference surface.

18. An agricultural utility machine, comprising:
a chassis of the machine;
a spreading tool movably mounted to the chassis for spreading crop during a spreading operation; and
an arrangement including at least a control device, the control device configured to automatically control a movement of the spreading tool during the spreading operation;
wherein the spreading tool comprises a working height, the control device controlling the movement of the spreading tool so that the working height of the spreading tool is set relative to a reference surface; and
wherein the working height is defined such that the crop is completely spread by the spreading tool during a single traverse of a spreading path.

19. The machine of claim 18, further comprising a defined coordinate system, wherein the control device is configured to determine a position or an orientation of the spreading tool in the defined coordinate system.

20. The machine of claim 19, wherein the control device is configured to determine the position or orientation of the spreading tool relative to a silo.

* * * * *